United States Patent
Werner et al.

(10) Patent No.: US 11,283,572 B2
(45) Date of Patent: Mar. 22, 2022

(54) PHASE TRACKING REFERENCE SIGNAL FOR NR CSI-RS

(71) Applicant: TELEFONAKTIEBOLAGET LM ERICSSON (PUBL), Stockholm (SE)

(72) Inventors: Karl Werner, Segeltorp (SE); Lars Lindbom, Karlstad (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/959,574

(22) PCT Filed: Jan. 3, 2018

(86) PCT No.: PCT/IB2018/050037
§ 371 (c)(1),
(2) Date: Jul. 1, 2020

(87) PCT Pub. No.: WO2019/135103
PCT Pub. Date: Jul. 11, 2019

(65) Prior Publication Data
US 2021/0083816 A1    Mar. 18, 2021

(51) Int. Cl.
*H04L 5/00* (2006.01)
*H04L 27/26* (2006.01)
*H04L 25/02* (2006.01)

(52) U.S. Cl.
CPC .......... *H04L 5/0048* (2013.01); *H04L 5/0023* (2013.01); *H04L 25/0226* (2013.01); *H04L 27/2613* (2013.01)

(58) Field of Classification Search
CPC . H04L 5/0023; H04L 5/0048; H04L 25/0226; H04L 27/2613
See application file for complete search history.

(56) References Cited

U.S. PATENT DOCUMENTS

2017/0302352 A1    10/2017  Islam et al.
2018/0132122 A1*    5/2018  Yoo ..................... H04L 27/0014
(Continued)

OTHER PUBLICATIONS

Nokia et al., "On PT-RS Design for NR", 3GPP TSG RAN WG1#88, R1-1703182, Feb. 13-17, 2017.
(Continued)

*Primary Examiner* — David B Lugo
(74) *Attorney, Agent, or Firm* — Christopher & Weisberg, P.A.

(57) ABSTRACT

Systems and methods that enable and provide compensation for phase noise when performing Channel State Information (CSI) measurements are disclosed. In some embodiments, a method of operation of a User Equipment 5 (UE) comprises determining that a reference signal associated with a CSI Reference Signal (CSI-RS) is present on two Orthogonal Frequency Division Multiplexing (OFDM) symbols onto which the CSI-RS is mapped. The reference signal is a reference signal that is present on OFDM symbols only when CSI-RS is present on the OFDM symbols. The method further comprises producing at 10 least one phase error estimate for the CSI-RS that is mapped onto at least one of the two OFDM symbols based on the reference signal, compensating for phase error on at least one of the two OFDM symbols based on the at least one phase error estimate, and generating and reporting CSI based on the CSI-RS after compensating for phase error.

24 Claims, 15 Drawing Sheets

(56) References Cited

U.S. PATENT DOCUMENTS

2018/0227929 A1\* 8/2018 Yoo .................... H04W 72/085
2020/0021470 A1\* 1/2020 Sun .................. H04L 25/03821
2021/0076389 A1\* 3/2021 Zhang ................ H04W 72/085
2021/0105114 A1\* 4/2021 Yum .................... H04L 5/0048

OTHER PUBLICATIONS

CATT, "Further discussion on RS for phase tracking", 3GPP TSG RAN WG1 Meeting #88, R1-1702088, Feb. 13-17, 2017.

\* cited by examiner

FIG. 1

PRB WITH CSI-RS

PRB WITH CSI-PTRS

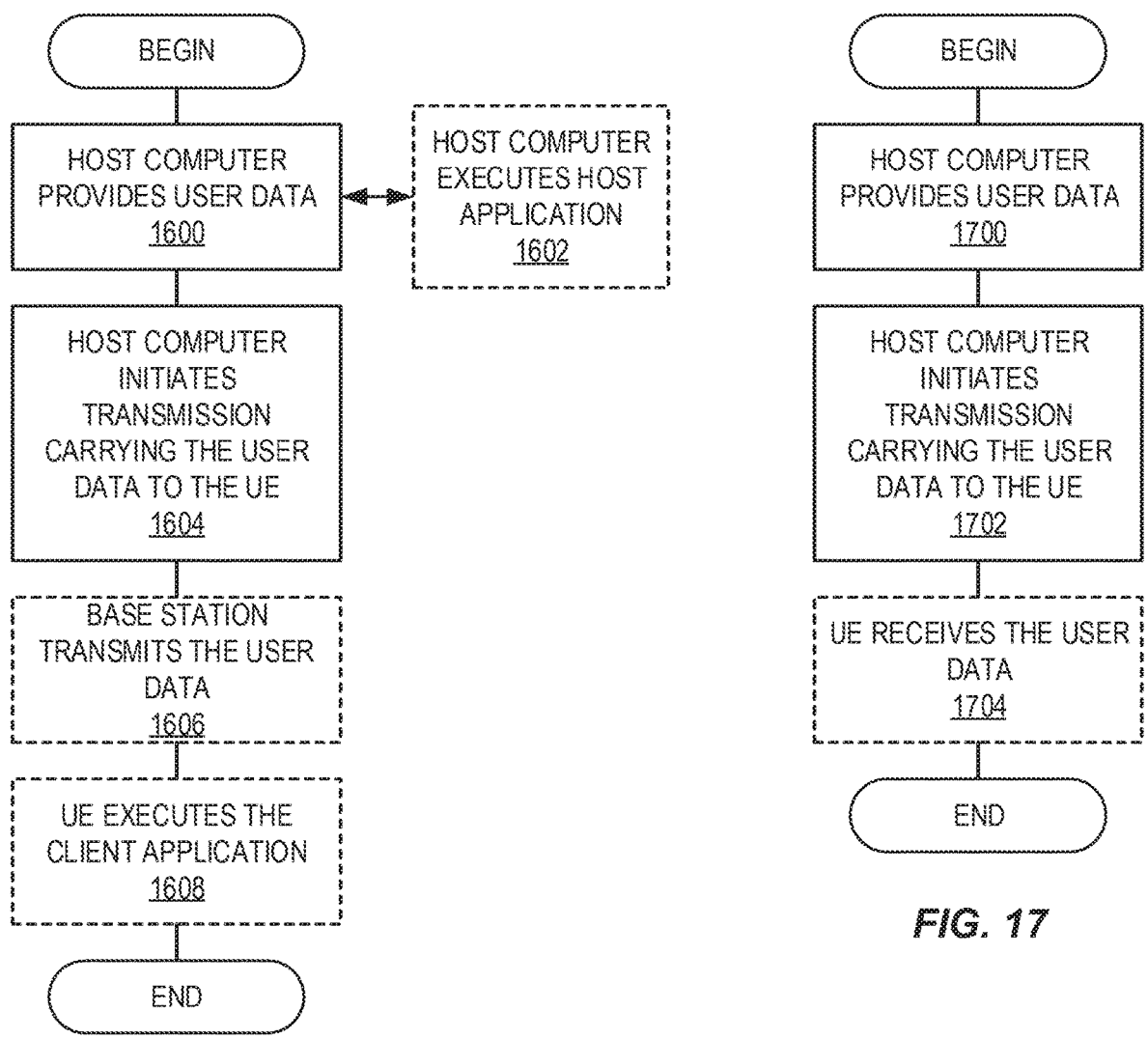

PHASE TRACKING REFERENCE SIGNAL FOR NR CSI-RS

RELATED APPLICATIONS

This application is a national stage application of International Patent Application No. PCT/IB2018/050037, filed Jan. 3, 2018, the disclosures of which is hereby incorporated herein by reference in its entirety.

TECHNICAL FIELD

The present disclosure relates to performing Channel State Information (CSI) measurements and, in particular, a new phase tracking reference signal for CSI Reference Signal (CSI-RS) that enables compensation of phase noise when performing CSI measurements based on the CSI-RS, which is particularly beneficial in Fifth Generation (5G) wireless communication systems such as, e.g., a Third Generation Partnership Project (3GPP) New Radio (NR) network.

BACKGROUND

The physical layer of the Third Generation Partnership Project (3GPP) Fifth Generation (5G) mobile radio system, which is referred to as New Radio (NR), is expected to handle a vast number of different transmission scenarios by operating in the frequency range from below 1 Gigahertz (GHz) to 100 GHz. Carrier frequencies above 6 GHz are not supported by Long Term Evolution (LTE). Therefore, as compared to LTE, NR requires a new and flexible design for the physical layer which offers good performance in a wider range of frequencies.

In mobile radio systems like LTE and NR, a reference signal is typically transmitted to aid radio channel knowledge but can also be transmitted for tracking phase impairments induced by a local oscillator of a transceiver. The design of a reference signal will depend on its use case and several types of reference signals are needed in a mobile radio system. The main purpose of a reference signal will often be reflected by its name. For example, a reference signal designed and used for coherent demodulation of a physical layer channel is referred to as a Demodulation Reference Signal (DM-RS), a reference signal designed and used for acquiring Channel State Information (CSI) in downlink is referred to as a CSI Reference Signal (CSI-RS), and a reference signal designed and used for phase tracking is referred to as a Phase Tracking Reference Signal (PT-RS).

The DM-RS is transmitted on the same antenna port as the associated physical layer channel, which is a prerequisite for demodulation, whereas the CSI-RS can be transmitted on a different antenna port. The Radio Access Technology (RAT) used in both LTE and NR is based on Orthogonal Frequency Division Multiplexing (OFDM), meaning that physical layer channels and reference signals are orthogonally multiplexed on the OFDM frequency-time grid by mapping them on different resource elements (i.e., Frequency Division Multiplexing (FDM)). Reference signals of the same type can share resource elements via code division multiplexing, e.g. by applying an Orthogonal Cover Code (OCC) over a group of resource elements in time and/or frequency.

A terminal can be configured to perform measurements on a set of CSI-RS resources where some of the CSI-RS are orthogonally multiplexed by using OCC. It has been agreed for NR that orthogonal multiplexing of CSI-RS is based on FDM, frequency-domain OCC, and time-domain OCC. The main reason for introducing OCC is that it allows for efficient use of power amplifier resources. Time-domain OCC essentially relies on the effective channel being close to constant across the OFDM symbols in the span of the code. Any variations of the channel will lead to loss of orthogonality between the multiplexed CSI-RS antenna ports.

NR supports operation on higher frequencies compared to legacy systems. Due to the properties of radio hardware at these carrier frequencies, phase noise becomes more significant compared to LTE. Therefore, PT-RS has been specified in NR to account for a common phase error on physical layer data channels and DM-RS. The PT-RS may need to be present in all OFDM symbols where data is present. In NR, PT-RS is associated with DM-RS antenna ports.

SUMMARY

Systems and methods that enable and provide compensation for phase noise when performing Channel State Information (CSI) measurements are disclosed. In some embodiments, a method of operation of a User Equipment (UE) in a wireless communication network comprises determining that a reference signal associated with a CSI Reference Signal (CSI-RS) is present on two Orthogonal Frequency Division Multiplexing (OFDM) symbols onto which the CSI-RS is mapped. The reference signal is a reference signal that is present on OFDM symbols only when CSI-RS is present on the OFDM symbols. The method further comprises producing at least one phase error estimate for the CSI-RS that is mapped onto at least one of the two OFDM symbols based on the reference signal and compensating for phase error on at least one of the two OFDM symbols onto which the CSI-RS is mapped based on the at least one phase error estimate. The method further comprises, after compensating for phase error on the at least one of the two OFDM symbols onto which the CSI-RS is mapped, generating and reporting CSI based on the CSI-RS. By compensating for the phase error(s) for the CSI-RS on the OFDM symbol(s), the CSI is improved.

In some embodiments, the CSI-RS is transmitted on a CSI-RS antenna port that is one of a plurality of CSI-RS antenna ports defined for the wireless communication network, and the reference signal is associated with the CSI-RS antenna port. Further, in some embodiments, the reference signal is transmitted on an antenna port that coincides with the CSI-RS antenna port. In some other embodiments, the reference signal is transmitted on an antenna port that is defined as being quasi co-located with the CSI-RS antenna port. In some other embodiments, the reference signal is transmitted on an antenna port that is defined as being quasi co-located with a subset of the plurality of CSI-RS antenna ports, the subset of the plurality of CSI-RS antenna ports comprising the CSI-RS antenna port.

In some embodiments, the reference signal is mapped to time-frequency resources within the two OFDM symbols onto which the reference signal is multiplexed with at least one other such reference signal for at least one other antenna port using frequency-domain Code Division Multiplexing (CDM), but not time-domain CDM. Further, in some embodiments, the CSI-RS is mapped to time-frequency resources within the two OFDM symbols onto which the CSI-RS is multiplexed with other CSI-RSs on other CSI-RS antenna ports of the plurality of CSI-RS antenna ports using both frequency-domain CDM and time-domain CDM.

In some embodiments, the reference signal is mapped to time-frequency resources in one Physical Resource Block (PRB) that have subcarrier and symbol indices that are the same as those of time-frequency resources to which the CSI-RS is mapped in another PRB.

In some embodiments, the reference signal is mapped to a set of time-frequency resources that is different than that to which the CSI-RS is mapped but within a same PRB.

In some embodiments, the at least one phase error estimate is at least one common phase error estimate that is common for all subcarriers. In some embodiments, the at least one phase error estimate is a phase error estimate for the CSI-RS mapped to one of the two OFDM symbols relative to a phase for the CSI-RS mapped to the other one of the two OFDM symbols.

In some embodiments, compensating for phase error on the at least one of the two OFDM symbols onto which the CSI-RS is mapped comprises compensating for phase error on one of the two OFDM symbols onto which the CSI-RS in mapped based on the phase error estimate.

In some embodiments, the reference signal is mapped to time-frequency resources at edges of a bandwidth configured for the CSI-RS.

In some embodiments, the reference signal is interleaved, in frequency, with the CSI-RS.

In some embodiments, the reference signal is transmitted on a subset of a plurality of CSI-RS antenna ports defined for the wireless communication network with a same sequence as that used for the CSI-RS but mapped to time-frequency resources in such a way that multiple antenna ports are not code-multiplexed in time.

In some embodiments, determining that the reference signal associated with the CSI-RS is present on the two OFDM symbols onto which the CSI-RS is mapped comprises receiving signaling from a base station that indicates that the reference signal is present on the two OFDM symbols onto which the CSI-RS is mapped.

In some embodiments, determining that the reference signal associated with the CSI-RS is present on the two OFDM symbols onto which the CSI-RS is mapped comprises receiving signaling from a base station that indicates that the reference signal is present on the two OFDM symbols onto which the CSI-RS is mapped and one or more configuration parameters for the reference signal.

In some embodiments, determining that the reference signal associated with the CSI-RS is present on the two OFDM symbols onto which the CSI-RS is mapped comprises determining that the reference signal associated with the CSI-RS is present on the two OFDM symbols onto which the CSI-RS is mapped based on: whether a Phase Tracking Reference Signal (PT-RS) for a Demodulation Reference Signal (DM-RS) and data is present in the two OFDM symbols; a configuration of the CSI-RS; a type of CSI report to be generated and reported by the UE; and/or whether frequency division multiplexing of the CSI-RS and data in the two OFDM symbols is assumed.

In some embodiments, determining that the reference signal associated with the CSI-RS is present on the two OFDM symbols onto which the CSI-RS is mapped comprises determining that the reference signal associated with the CSI-RS is present on the two OFDM symbols onto which the CSI-RS is mapped and one or more configuration parameters for the reference signal based on: whether a PT-RS for a DM-RS and data is present in the two OFDM symbols; a configuration of the CSI-RS; a type of CSI report to be generated and reported by the UE; and/or whether frequency division multiplexing of the CSI-RS and data in the two OFDM symbols is assumed.

In some embodiments, the one or more configuration parameters comprise time-frequency resources to which the reference signal is mapped within the two OFDM symbols.

In some embodiments, the one or more configuration parameters comprise one or more parameters that define a sequence used for the reference signal.

In some embodiments, the one or more configuration parameters comprise a bandwidth of the reference signal within the two OFDM symbols.

In some embodiments, the two OFDM symbols comprise a first OFDM symbol and a second OFDM symbol, producing the at least one phase error estimate for the CSI-RS comprises producing a phase estimate for the CSI-RS in the second OFDM symbol, where the phase estimate is an estimate of a phase error for the CSI-RS in the second OFDM symbol relative to a phase for the CSI-RS in the first OFDM symbol, and compensating for phase error on the two OFDM symbols comprises rotating a phase of the CSI-RS in at least one of the first and second OFDM symbols based on the phase error estimate to compensate for the phase error.

Embodiments of a UE for a wireless communication network are also disclosed. In some embodiments, a UE for a wireless communication network is adapted to determine that a reference signal associated with a CSI-RS is present on two OFDM symbols onto which the CSI-RS is mapped, where the reference signal is a reference signal that is present on OFDM symbols only when CSI-RS is present on the OFDM symbols. The UE is further adapted to produce at least one phase error estimate for the CSI-RS that is mapped onto the two OFDM symbols based on the reference signal and compensate for phase error on at least one of the two OFDM symbols onto which the CSI-RS is mapped based on the at least one phase error estimate. The UE is further adapted to, after compensating for phase error on the at least one of the two OFDM symbols onto which the CSI-RS is mapped, generate and report CSI based on the CSI-RS.

In some embodiments, a UE for a wireless communication network comprises one or more transceivers, one or more processors, and memory storing instructions executable by the one or more processors whereby the UE is operable to determine that a reference signal associated with a CSI-RS is present on two OFDM symbols onto which the CSI-RS is mapped where the reference signal being a reference signal that is present on OFDM symbols only when CSI-RS is present on the OFDM symbols, produce at least one phase error estimate for the CSI-RS that is mapped onto at least one of the two OFDM symbols based on the reference signal, compensate for phase error on at least one of the two OFDM symbols onto which the CSI-RS is mapped based on the at least one phase error estimate, and generate and report CSI based on the CSI-RS after compensating for phase error on the at least one of the two OFDM symbols onto which the CSI-RS is mapped.

In some embodiments, a UE for a wireless communication network comprises a determining module, a producing module, a compensating module, and a reporting module. The determining module is operable to determine that a reference signal associated with a CSI-RS is present on two OFDM symbols onto which the CSI-RS is mapped, where the reference signal is a reference signal that is present on OFDM symbols only when CSI-RS is present on the OFDM symbols. The producing module is operable to produce at least one phase error estimate for the CSI-RS that is mapped onto at least one of the two OFDM symbols based on the reference signal. The compensating module is operable to compensate for phase error on at least one of the two OFDM symbols onto which the CSI-RS is mapped based on the at least one phase error estimate. The reporting module is operable to, after compensating for phase error on the at least one of the two OFDM symbols onto which the CSI-RS is mapped, generate and report CSI based on the CSI-RS.

Embodiments of a method of operation of a base station in a wireless communication network are also disclosed. In some embodiments, a method of operation of a base station in a wireless communication network comprises transmitting a reference signal associated with a CSI-RS in two OFDM symbols in which the CSI-RS is mapped, where the reference signal is a reference signal that is present on OFDM symbols only when CSI-RS is present on the OFDM symbols. The method further comprises receiving, from a UE, a report comprising a CSI measurement that is based on the CSI-RS after phase compensation based on the reference signal.

In some embodiments, the CSI-RS is transmitted on a CSI-RS antenna port that is one of a plurality of CSI-RS antenna ports defined for the wireless communication network, and the reference signal is associated with the CSI-RS antenna port. Further, in some embodiments, the reference signal is transmitted on an antenna port that coincides with the CSI-RS antenna port. In some other embodiments, the reference signal is transmitted on an antenna port that is defined as being quasi co-located with the CSI-RS antenna port. In some other embodiments, the reference signal is transmitted using a radio unit that shares a local oscillator with a radio unit (e.g., a different radio unit) used to transmit the CSI-RS on the CSI-RS antenna port. In some other embodiments, the reference signal is transmitted on an antenna port that is defined as being quasi co-located with a subset of the plurality of CSI-RS antenna ports, the subset of the plurality of CSI-RS antenna ports comprising the CSI-RS antenna port.

In some embodiments, the reference signal is mapped to time-frequency resources within the two OFDM symbols onto which the reference signal is multiplexed with at least one other such reference signal for at least one other antenna port using frequency-domain CDM, but not time-domain CDM. Further, in some embodiments, the CSI-RS is mapped to time-frequency resources within the two OFDM symbols onto which the CSI-RS is multiplexed with other CSI-RSs on other CSI-RS antenna ports of the plurality of CSI-RS antenna ports using both frequency-domain CDM and time-domain CDM.

In some embodiments, the reference signal is mapped to time-frequency resources in one PRB that have subcarrier and symbol indices that are the same as those of time-frequency resources to which the CSI-RS is mapped in another PRB. In some other embodiments, the reference signal is mapped to a set of time-frequency resources that is different than that to which the CSI-RS is mapped but within a same PRB.

In some embodiments, the reference signal is mapped to time-frequency resources at edges of a bandwidth configured for the CSI-RS. In some other embodiments, the reference signal is interleaved, in frequency, with the CSI-RS.

In some embodiments, the reference signal is transmitted on a subset of a plurality of CSI-RS antenna ports defined for the wireless communication network with a same sequence as that used for the CSI-RS but mapped to time-frequency resources in such a way that multiple antenna ports are not code-multiplexed in time.

In some embodiments, the method further comprises signaling, to the UE, an indication that indicates that the reference signal is present on the two OFDM symbols onto which the CSI-RS is mapped.

In some embodiments, the method further comprises signaling, to the UE, an indication that indicates that the reference signal is present on the two OFDM symbols onto which the CSI-RS is mapped and one or more configuration parameters for the reference signal.

In some embodiments, the method further comprises signaling, to the UE, an indication that indicates that the reference signal is present on the two OFDM symbols onto which the CSI-RS is mapped, wherein the indication comprises: an indication as to whether a PT-RS for a DM-RS and data is present in the two OFDM symbols; a configuration of the CSI-RS; an indication of a type of CSI report that is to be generated and reported by the UE; and/or an indication as to whether frequency division multiplexing of the CSI-RS and data in the two OFDM symbols is assumed.

In some embodiments, the method further comprises signaling, to the UE, an indication that indicates that the reference signal is present on the two OFDM symbols onto which the CSI-RS is mapped and one or more configuration parameters for the reference signal, wherein the indication comprises: an indication as to whether a PT-RS for a DM-RS and data is present in the two OFDM symbols; a configuration of the CSI-RS; an indication of a type of CSI report that is to be generated and reported by the UE; and/or an indication as to whether frequency division multiplexing of the CSI-RS and data in the two OFDM symbols is assumed.

In some embodiments, the one or more configuration parameters comprise time-frequency resources to which the reference signal is mapped within the two OFDM symbols.

In some embodiments, the one or more configuration parameters comprise one or parameters that define a sequence used for the reference signal.

In some embodiments, the one or more configuration parameters comprise a bandwidth of the reference signal within the two OFDM symbols.

Embodiments of a base station for a wireless communication network are also disclosed. In some embodiments, a base station for a wireless communication network is adapted to transmit a reference signal associated with a CSI-RS in two OFDM symbols in which the CSI-RS is mapped, where the reference signal is a reference signal that is present on OFDM symbols only when CSI-RS is present on the OFDM symbols. The base station is further adapted to receive, from a UE, a report comprising a CSI measurement that is based on the CSI-RS after phase compensation based on the reference signal.

In some embodiments, a base station for a wireless communication network comprises one or more radio units, one or more processors, and memory storing instructions executable by the one or more processors whereby the base station is operable to transmit a reference signal associated with a CSI-RS in two OFDM symbols in which the CSI-RS is mapped where the reference signal is a reference signal that is present on OFDM symbols only when CSI-RS is present on the OFDM symbols, and receive, from a UE, a report comprising a CSI measurement that is based on the CSI-RS after phase compensation based on the reference signal.

In some embodiments, a base station for a wireless communication network comprises a transmitting module and a receiving module. The transmitting module is operable to transmit a reference signal associated with a CSI-RS in two OFDM symbols in which the CSI-RS is mapped, where the reference signal is a reference signal that is present on OFDM symbols only when CSI-RS is present on the OFDM symbols. The receiving module is operable to receive, from a UE, a report comprising a CSI measurement that is based on the CSI-RS after phase compensation based on the reference signal.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 illustrates one potential solution to the problem of limited performance of Channel State Information (CSI) Reference Signal (CSI-RS) in New Radio (NR);

FIG. 16 is a flowchart illustrating a method implemented in a communication system in accordance with one embodiment of the present disclosure;

FIG. 17 is a flowchart illustrating a method implemented in a communication system in accordance with one embodiment of the present disclosure;

DETAILED DESCRIPTION

Figure 2:
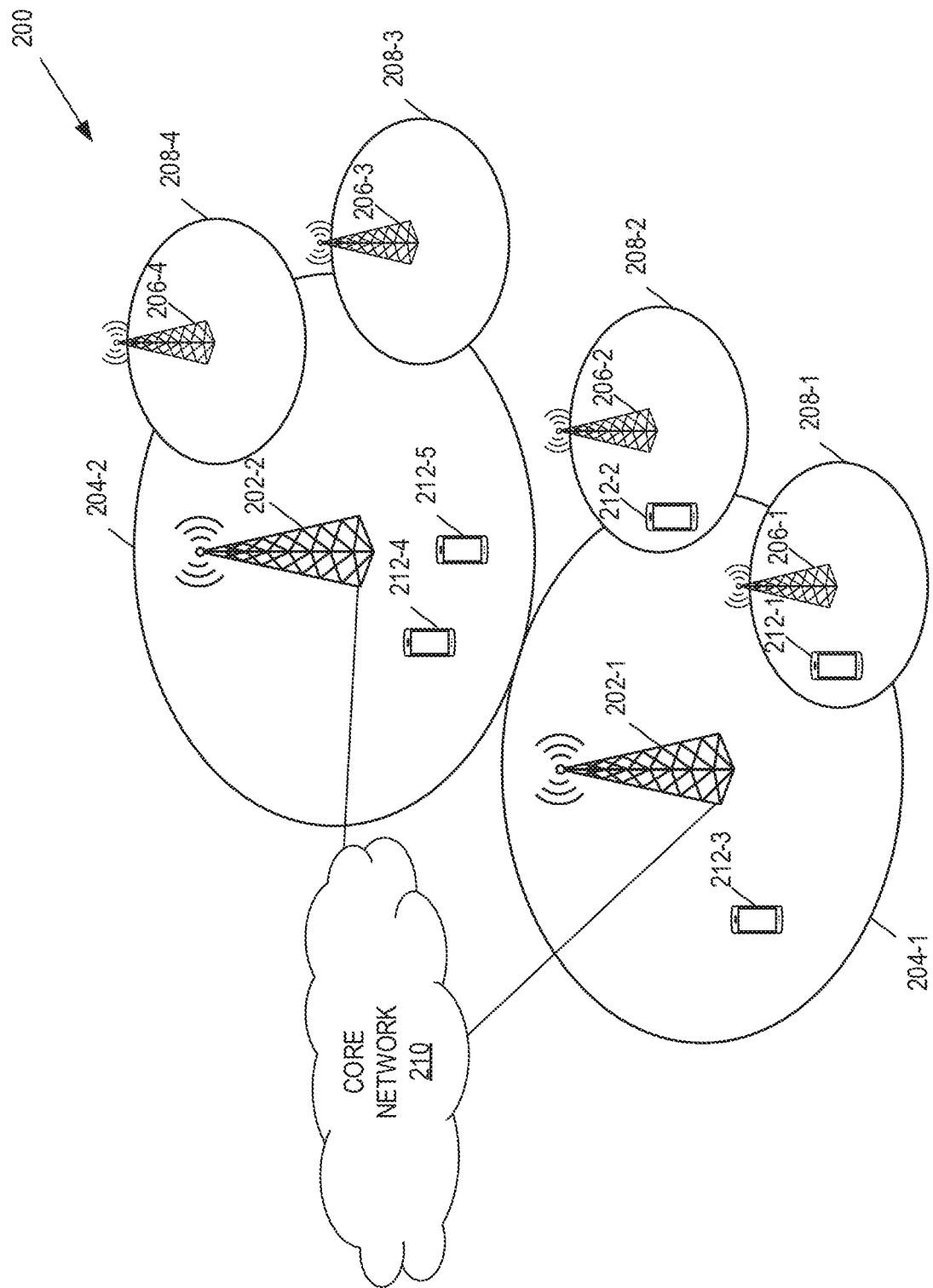
FIG. 2 illustrates one example of a wireless communication network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

As discussed above, NR supports operation on higher frequencies compared to legacy systems. Due to the properties of radio hardware at these carrier frequencies, phase noise becomes more significant compared to LTE. Therefore, Phase Tracking Reference Signal (PT-RS) has been specified in NR to account for a common phase error on physical layer data channels and Demodulation Reference Signal (DM-RS). The PT-RS may need to be present in all Orthogonal Frequency Division Multiplexing (OFDM) symbols where data is present. In NR, PT-RS is associated with DM-RS antenna ports.

Figure 1:
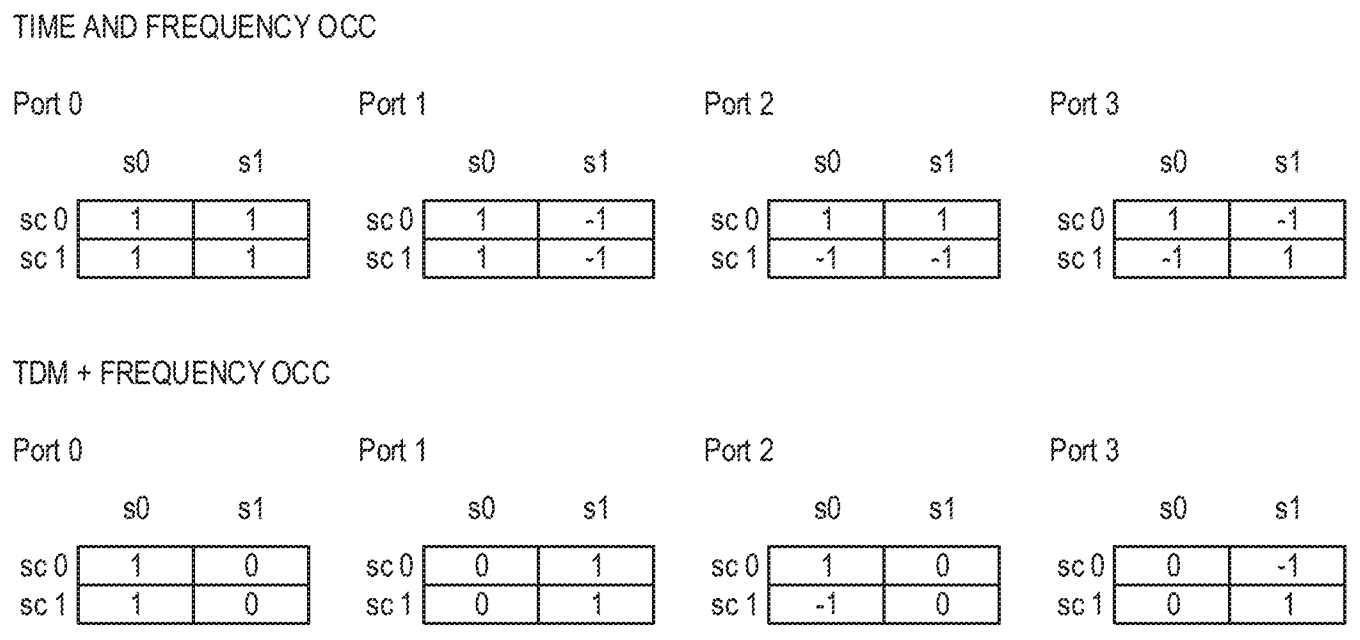

From the discussion above, it can be understood that phase noise may also limit the performance of Channel State Information (CSI) Reference Signal (CSI-RS). One solution to this problem with sensitivity to phase noise/phase error is to use Time Domain Multiplexing (TDM) between the CSI-RS ports instead of time-domain Orthogonal Cover Code (OCC). This solution is supported according to current NR agreements. However, this solution will lead to under-utilization of power amplifier resources. This is illustrated in FIG. 1. The top example in FIG. 1 show a 2,2 CSI-RS component with time-domain and frequency-domain OCC to multiplex four CSI-RS ports. The lower example in FIG. 1 show a solution based on TDM. Clearly, the total power per port is smaller in the lower example. Hence, time-domain OCC is preferred over TDM.

Another solution is to use PT-RS to compensate the phase of CSI-RS and hence allow for time-domain OCC. In scenarios where the impact of phase noise is significant, it may not be assumed that the PT-RS associated with data transmissions can also be used to compensate for the effect of phase noise on the CSI-RS. This may be the case if:
  A terminal is configured to measure CSI-RS in a slot where data has not been scheduled for that terminal. Note that DM-RS and PT-RS are closely connected—scheduling PT-RS without DM-RS is not possible.
  The CSI-RS and PT-RS associated with data are not Frequency Division Multiplexing (FDM) (e.g., when CSI-RS and data is not FDM).
  The CSI-RS cannot be assumed to be Quasi Co-Located (QCL) with the data (e.g., when transmitted from antennas/radio units that do not share the Local Oscillator (LO) with data/PT-RS).

In light of the discussion above, there is a need for systems and methods to account for phase error on CSI-RS even when PT-RS is not present.

Systems and methods are disclosed herein that relate to a new reference signal, referred to herein as a CSI-PTRS, that is associated with CSI-RS, where the CSI-PTRS enables tracking of the phase error (e.g., the LO phase) across the OFDM symbols where CSI-RS is mapped. The CSI-PTRS is mapped to the same OFDM symbols as CSI-RS and is only present when CSI-RS is present. The embodiments of the proposed solution described herein allow for compensation of the effect of phase noise on CSI-RS. This is important as the preferred multiplexing solution assumed for CSI-RS can be sensitive to phase noise. The embodiments of the proposed solution described herein may hence allow for improved CSI accuracy.

FIG. 2 illustrates one example of a wireless communication network 200 in which embodiments of the present disclosure may be implemented. In the embodiments described herein, the wireless communication network 200 is a 5G NR network. In this example, the wireless communication network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base stations 202. Likewise, the macro cells 204-1 and 204-2 are generally referred to herein collectively as macro cells 204 and individually as macro cell 204. The wireless communication network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to UEs 212-1 through 212-5 in the corresponding cells 204 and 208. The UEs 212-1 through 212-5 are generally referred to herein collectively as UEs 212 and individually as UE 212.

As discussed below in detail, the base stations 202 (and in some embodiments the low power nodes 206) transmit and the UEs 212 receive a new reference signal, referred to herein as CSI-PTRS, that is associated with CSI-RS, where the CSI-PTRS enables tracking of the phase error (e.g., the LO phase) across the OFDM symbols where CSI-RS is mapped. The CSI-PTRS is mapped to the same OFDM symbols as CSI-RS and is only present when CSI-RS is present. Further, if multiple CSI-PTRSs for multiple CSI-PTRS antenna ports are multiplexed onto the same set of time-frequency resources, no time-domain Code Division Multiplexing (CDM) (e.g., time-domain OCC) is used.

Note that a key distinction between CSI-PTRS and PT-RS in NR (i.e., the PT-RS associated with DM-RS and thus the physical data channels) is that the CSI-PTRS density in time does not depend on the Modulation and Coding Scheme (MCS) of the data, which is the case with PT-RS in NR.

In some embodiments, the CSI-PTRS is transmitted on an antenna port(s) that coincides with CSI-RS antenna port(s). As used herein, an antenna port that "coincides with a CSI-RS antenna port" means that the two antenna ports (i.e., the antenna port on which the CSI-PTRS is transmitted and the CSI-RS antenna port) are the same antenna port. In some other embodiments, the CSI-PTRS is transmitted on an antenna port that is QCL with all or a subset of the CSI-RS antenna ports of the wireless communication network 200, e.g., with respect to phase, local oscillator characteristics/phase, and/or phase noise. For example, if there are twelve CSI-RS antenna ports where antenna ports 0, 1, 2, and 3 are multiplexed onto the same time-frequency resources (i.e., the same resource elements) using time-domain and frequency domain OCC, antenna ports 4, 5, 6, and 7 are multiplexed onto the same time-frequency resources using time-domain and frequency-domain OCC, and antenna ports 8, 9, 10, and 11 are multiplexed onto the same time-frequency resources using time-domain and frequency-domain OCC, then a CSI-PTRS may be transmitted on an antenna port that is assumed to be QCL with all CSI-RS antenna ports or some defined subset of the CSI-RS antenna ports (e.g., CSI-RS antenna ports 0, 1, 2, and 3), e.g., with respect to phase, local oscillator characteristics/phase, and/or phase noise. Note that different CSI-PTRS antenna ports may be defined for each of multiple different subsets of the CSI-RS antenna ports (e.g., one CSI-PTRS antenna port may be defined as being QCL with CSI-RS antenna ports 0, 1, 2, and 3 e.g., with respect to phase, local oscillator characteristics/phase, and/or phase noise, another CSI-PTRS antenna port may be defined as being QCL with CSI-RS antenna ports 4, 5, 6, and 7, and so on). The CSI-PTRS is utilized at the UE 212 to compensate for the effect of phase noise on the CSI-RS. In some other embodiments, the reference signal is transmitted using a radio unit that shares a local oscillator with a radio unit used to transmit the CSI-RS on the CSI-RS antenna port.

CSI-PTRS Structure

In a first embodiment, CSI-PTRS is associated with a CSI-RS, and the CSI-PTRS is placed on the edges of the configured frequency band in which the associated CSI-RS is transmitted. Further, in some variations of the first embodiment, the CSI-PTRS is transmitted using the same resource element pattern as the associated CSI-RS. This has the advantage of not affecting the overall combined footprint of CSI-RS and CSI-PTRS compared to the footprint of CSI-RS only (except for widening the band configured for CSI-RS). Note that in some other variations of the first embodiment, the CSI-PTRS is added at the edges of the configured frequency band in which the associated CSI-RS is transmitted, thereby effectively widening the frequency band configured for CSI-RS (e.g., M Physical Resource Blocks (PRBs) are added at each edge of the configured frequency band for the associated CSI-RS are used to transmit CSI-PTRS, where M≥1). In some other variations of the first embodiment, the CSI-PTRS is at least partially within the configured frequency band in which the associated CSI-RS is transmitted (e.g., M PRBs at each edge but within the configured frequency band for the associated CSI-RS are used to transmit CSI-PTRS, where M≥1). For example, at each edge of the configured frequency band for CSI-RS, one or more PRBs may be transmitted with CSI-PTRS instead of CSI-RS.

The first embodiment is beneficial for simplicity of rate matching of other signals and channels. The first embodiment also allows CSI-RS to be regularly distributed within its configured bandwidth (no holes created for CSI-RS due to CSI-PTRS).

Figure 3:
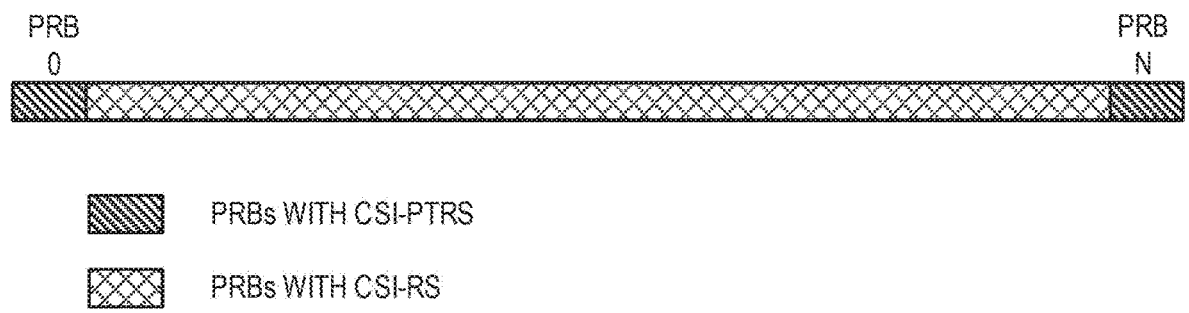
FIG. 3 illustrates mapping of a CSI Phase Tracking Reference Signal (CSI-PTRS) to time-frequency resources at each edge of a configured CSI-RS frequency band in accordance with a first embodiment of the present disclosure.
Figure 4A:
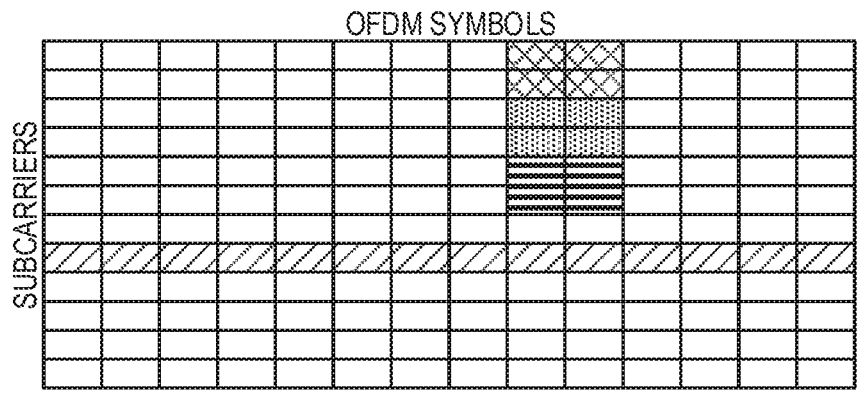
FIGS. 4A and 4B illustrate one example of a Physical Resource Block (PRB) including a CSI-RS and one example of a PRB including a CSI-PTRS in accordance with some embodiments of the present disclosure.
Figure 4B:
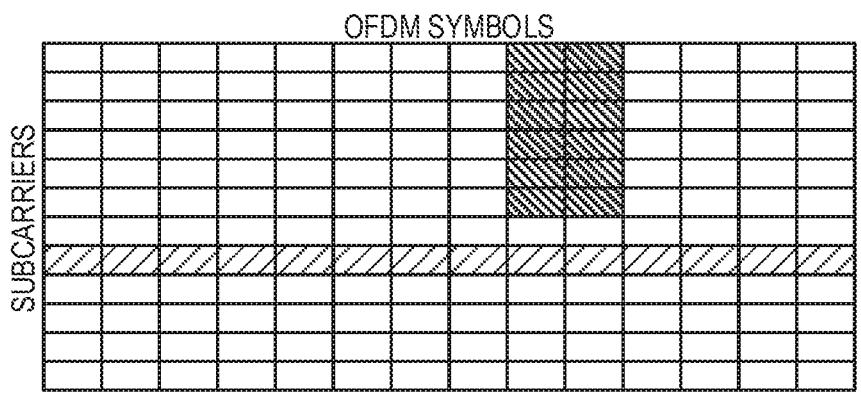

Examples of the first embodiment are illustrated in FIG. 3 and FIGS. 4A and 4B. FIG. 3 illustrates an example where CSI-PTRS is mapped to (i.e., transmitted in) one PRB at each edge of the configured frequency band for the associated CSI-RS. In this example, the PRBs to which CSI-PTRS is mapped are labelled as PRB 0 and PRB N. Note that in some variations of the first embodiment, PRBs 0 and N include CSI-PTRS but not CSI-RS. In other variations of the first embodiment, PRBs 0 and N include both CSI-PTRS and CSI-RS.

FIG. 4A illustrates one example of a PRB including CSI-RS. In this example, there are twelve CSI-RS antenna ports. CSI-RS antenna ports 0, 1, 2, and 3 are multiplexed onto one set of resource elements within the PRB using time-domain and frequency-domain OCC. CSI-RS antenna ports 4, 5, 6, and 7 are multiplexed onto another set of resource elements within the PRB using time-domain and frequency-domain OCC, and CSI-RS antenna ports 8, 9, 10, and 11 are multiplexed onto another set of resource elements within the PRB using time-domain and frequency-domain OCC.

FIG. 4B illustrates one example of a PRB that includes CSI-PTRS where the CSI-PTRSs are mapped to the same resource elements as CSI-RS (but in a different PRB). In other words, the CSI-PTRS is mapped to time-frequency resources (in this case REs) in the PRB illustrated in FIG. 4B that have subcarrier and symbol indices that are the same as those of time-frequency resources (in this case REs) to which the CSI-RS is mapped in another PRB (e.g., the PRB of FIG. 4A). The PRB of FIG. 4B is one example of PRBs 0 and N of FIG. 3. In this example, the CSI-PTRS is assumed to be QCL with all of the CSI-RS antenna ports.

In some other variations of the first embodiment, different CSI-PTRS antenna ports may be defined, where each CSI-PTRS antenna port is assumed to be QCL with a different subset of the CSI-RS antenna ports e.g., with respect to phase, local oscillator characteristics/phase, and/or phase noise. For example, two PRBs may be added at each edge of the frequency band in which the associated CSI-RS is to be configured, where a first pair of the PRBs (one at each edge) is used for a first CSI-PTRS antenna port that is assumed to be QCL with CSI-RS antenna ports 0-7 e.g., with respect to phase, local oscillator characteristics/phase, and/or phase noise and a second pair of the PRBs (one at each edge) is used for a second CSI-PTRS antenna port that is assumed to be QCL with CSI-RS antenna ports 8-11 e.g., with respect to phase, local oscillator characteristics/phase, and/or phase noise. However, this is only one example. Numerous variations will be apparent to one of skill in the art upon reading this disclosure. Thus, more generally, CSI-PTRS for one or more CSI-PTRS antenna ports is transmitted in one or more PRBs at the edge of the configured frequency band in which the associated CSI-RS is to be transmitted, where each CSI-PTRS antenna port is QCL with all or a subset of the CSI-RS antenna ports.

Figure 5:
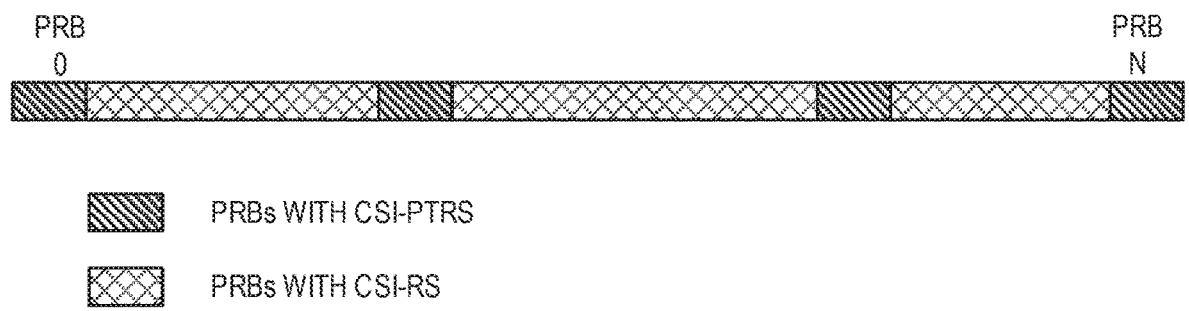
FIG. 5 illustrates mapping of CSI-PTRS to time-frequency resources such that CSI-PTRS is interleaved with CSI-RS in frequency in accordance with a second embodiment of the present disclosure.
Figure 6A:
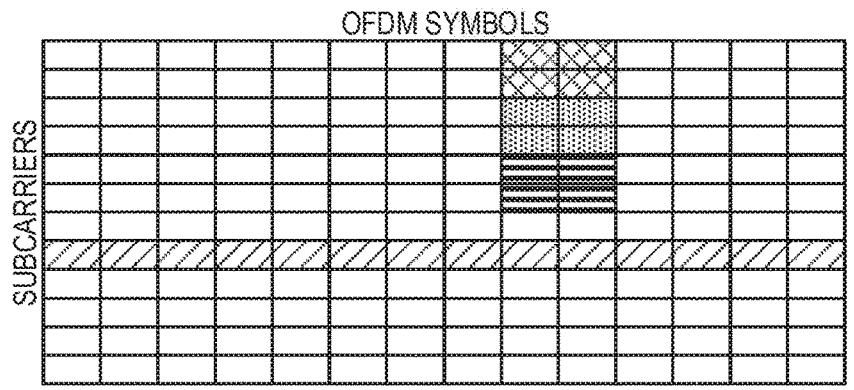
FIGS. 6A and 6B illustrate one example of a PRB including a CSI-RS and one example of a PRB including a CSI-PTRS in accordance with some other embodiments of the present disclosure.

In a second embodiment, CSI-PTRS is interleaved in frequency with the CSI-RS with which the CSI-PTRS is associated. One example of the second embodiment is illustrated in FIG. 5 where PRBs containing CSI-PTRS are interleaved in frequency with PRBs containing CSI-RS. In some variations of the second embodiment, the mapping of CSI-PTRS within a PRB is according to FIG. 4B in which case the overall footprint of CSI-PTRS and CSI-RS is not affected by the presence of CSI-PTRS. In some other variations, the mapping of CSI-RS in a PRB containing CSI-RS is according to FIG. 6A, and the mapping of CSI-PTRS in a PRB containing both CSI-RS and CSI-PTRS is according to FIG. 6B, in which case the overall footprint will depend on CSI-PTRS presence. If the mapping of CSI-RS and CSI-PTRS is done according to the example of FIG. 5 and FIGS. 4A and 4B, the density of CSI-RS across the frequency band will be irregular while, if the mapping of CSI-RS and CSI-PTRS is done according to FIG. 5 and FIGS. 6A and 6B, the density of CSI-RS is regular.

Figure 6B:
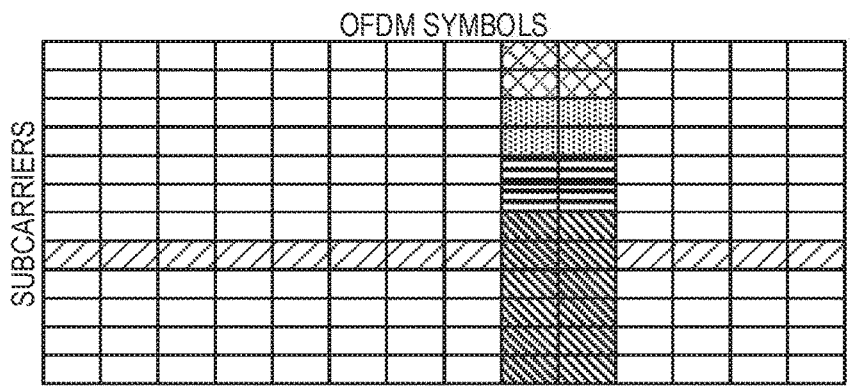

Note that, with respect to the example of FIG. 6B, the CSI-PTRS is, in some variations of the second embodiment, transmitted on an antenna port that is QCL with all CSI-RS antenna ports e.g., with respect to phase, local oscillator characteristics/phase, and/or phase noise. In some other variations of the second embodiment, different CSI-PTRS antenna ports may be QCL with different subsets of the CSI-RS antenna ports e.g., with respect to phase, local oscillator characteristics/phase, and/or phase noise. As one example, the CSI-PTRS in some PRBs may be assumed to be QCL with a first subset of the CSI-RS antenna ports e.g., with respect to phase, local oscillator characteristics/phase, and/or phase noise while the CSI-PTRS in some other PRBs may be assumed to be QCL with a second subset of the CSI-RS antenna ports e.g., with respect to phase, local oscillator characteristics/phase, and/or phase noise. As another example, different resource sets of resource elements in a PRB may be allocated for different CSI-PTRS antenna ports that are QCL with different subsets of the CSI-RS antenna ports e.g., with respect to phase, local oscillator characteristics/phase, and/or phase noise.

Figure 7A:
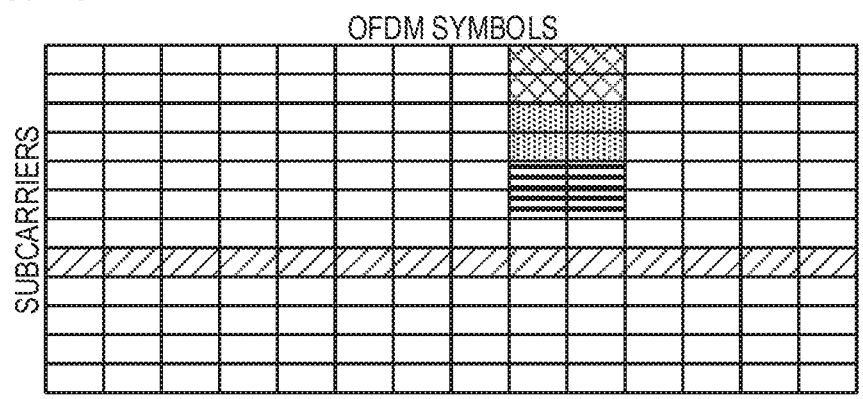
FIGS. 7A through 7C illustrate one example of a PRB including CSI-RS and examples of PRBs including different CSI-PTRS antenna ports in such a way that multiple CSI-RS antenna ports are not code-multiplexed in time in PRBs including CSI-PTRS.
Figure 7B:
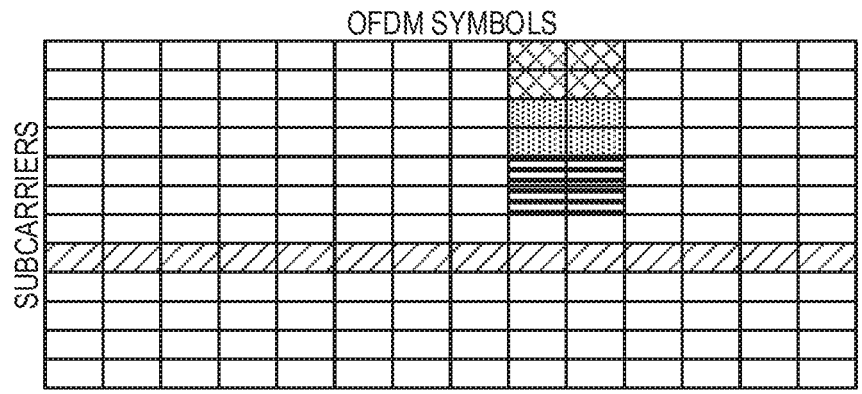
Figure 7C:
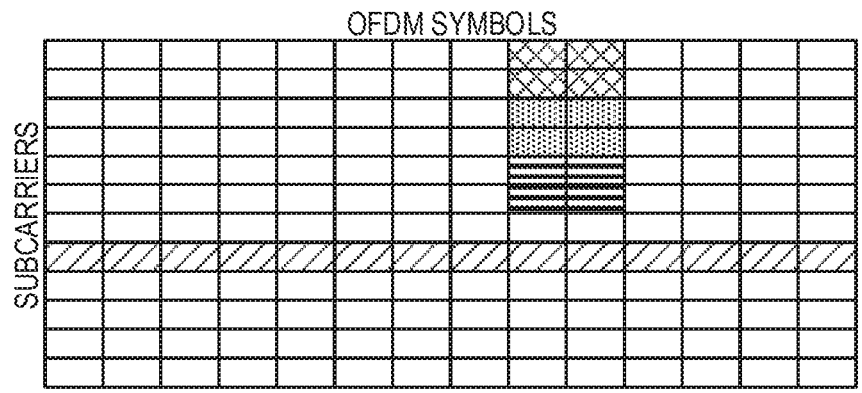

In a third embodiment, CSI-PTRS is transmitted on a subset of the CSI-RS antenna ports (or the full set of CSI-RS antenna ports) and with the same sequence as that used for the associated CSI-RS, but mapped to the resource element grid in such a way that multiple CSI-RS antenna ports are not code-multiplexed in time in PRBs including CSI-PTRS. One example of the third embodiment is illustrated in FIGS. 7A through 7C. FIG. 7A illustrates the mapping of CSI-RS antenna ports onto time-frequency resources within a PRB (i.e., the mapping of the CSI-RS antenna ports to OFDM subcarriers during two OFDM symbols) using a combination of time-domain and frequency-domain OCC. FIGS. 7B and 7C illustrate the mapping of CSI-PTRS antenna ports onto the same time-frequency resources in such a way that time-domain CDM (i.e., time-domain OCC) need not be used. Specifically, FIG. 7B illustrates:

the mapping of CSI-PTRS antenna ports 0 and 1 to the same time-frequency resources as CSI-RS antenna ports 0, 1, 2, and 3 (but in a different PRB), where the CSI-PTRS are multiplexed using frequency-domain OCC or no OCC (i.e., no CDM) is used at all;

the mapping of CSI-PTRS antenna ports 4 and 5 to the same time-frequency resources as CSI-RS antenna ports 4, 5, 6, and 7 (but in a different PRB), where the CSI-PTRS are multiplexed using frequency-domain OCC or no OCC (i.e., no CDM) is used at all;

the mapping of CSI-PTRS antenna ports 8 and 9 to the same time-frequency resources as CSI-RS antenna ports 8, 9, 10, and 11 (but in a different PRB), where the CSI-PTRS are multiplexed using frequency-domain OCC or no OCC (i.e., no CDM) is used at all.

Similarly, FIG. 7C illustrates:

the mapping of CSI-PTRS antenna ports 2 and 3 to the same time-frequency resources as CSI-RS antenna ports 0, 1, 2, and 3 (but in a different PRB), where the CSI-PTRS are multiplexed using frequency-domain OCC or no OCC (i.e., no CDM) is used at all;

the mapping of CSI-PTRS antenna ports 6 and 7 to the same time-frequency resources as CSI-RS antenna ports 4, 5, 6, and 7 (but in a different PRB), where the CSI-PTRS are multiplexed using frequency-domain OCC or no OCC (i.e., no CDM) is used at all;

the mapping of CSI-PTRS antenna ports 10 and 11 to the same time-frequency resources as CSI-RS antenna ports 8, 9, 10, and 11 (but in a different PRB), where the CSI-PTRS are multiplexed using frequency-domain OCC or no OCC (i.e., no CDM) is used at all.

As an example, in one variation of the first embodiment, the PRBs of FIGS. 7B and 7C are mapped to the lower and upper edges of the configured frequency band in which the associated CSI-RS is transmitted (e.g., to PRBs 0 and N in FIG. 3, respectively). Embodiment 3 allows full power utilization of all CSI-RS ports.

Signaling of CSI-PTRS Presence

The presence and configuration of CSI-PTRS may be configured by the wireless communication network 200 (e.g., by the base station 202), e.g., over Radio Resource Control (RRC) signaling or some other type of signaling. In some embodiments, the presence and configuration of the CSI-PTRS is configured explicitly. For example, an indication may be signaled to the UE 212 that explicitly indicates when the CSI-PTRS is present. As one specific example, the UE 212 is configured to expect CSI-PTRS to be present where Non-Zero Power (NZP) CSI-RS is present. In addition, one or more parameters for the CSI-PTRS may be explicitly configured. These parameters may include, for example, a location of the CSI-PTRS, a bandwidth of the CSI-PTRS (e.g., expressed as a number of PRBs), or the like.

In some other embodiments, the signaling of the presence of the CSI-PTRS and/or the signaling of the configuration of CSI-PTRS is implicit. For example, in some embodiments, presence of CSI-PTRS and, optionally, one or more configuration parameters for the CSI-PTRS is determined based on:

Presence of PT-RS for DM-RS/data: If PT-RS is configured for data, the UE 212 can assume that CSI-PTRS is configured when CSI-RS is configured; or, alternatively, the UE 212 can assume that CSI-PTRS is not present when PT-RS is present for data and data is scheduled to be frequency division multiplexed with CSI-RS;

Configuration of CSI-RS: In some embodiments, a configuration of the CSI-RS may imply time-domain OCC or no time-domain OCC for CSI-RS. If the CSI-RS configuration implies no time-domain OCC for CSI-RS, then the UE 212 can assume that CSI-PTRS is not present. Otherwise, the UE 212 can assume that CSI-PTRS is present, e.g., if data is not scheduled to be frequency division multiplexed with CSI-RS;

Nature/type of CSI report: Phase error may impact some types of CSI reports (e.g., Channel Quality Indication (CQI), Precoding Matrix Indicator (PMI), and/or rank reports) but not impact some other types of CSI reports (e.g., Reference Signal Received Power (RSRP)). Thus, if the UE 212 is configured to report one type of CQI report (e.g., report CQI, PMI, and/or rank), the UE 212 can assume that CSI-PTRS is present, e.g., if data is not scheduled to be frequency division multiplexed with CSI-RS. Conversely, if the UE 212 is configured to report another type of CQI report (e.g., to report RSRP but not CQI, PMI, or rank), the UE 212 can assume that CSI-PTRS is not present; and/or FDM of CSI-RS and data: If FDM of CSI-RS and data is assumed (e.g., due to scheduling of data for the UE 212 when CSI-RS is present), then the UE 212 can assume that no CSI-PTRS is present.

If the first embodiment of the CSI-PTRS structure is implemented, the CSI-PTRS configuration may include the bandwidth of the CSI-PTRS (e.g., the number of PRBs where CSI-PTRS is transmitted instead of CSI-RS or, equivalently, in which PRBs time-domain OCC is disabled). The bandwidth may be expressed as the number of PRBs used for CSI-PTRS at each end of the frequency band in which CSI-RS is transmitted.

In some embodiments, the UE 212 is explicitly or implicitly configured with one or more QCL assumptions for the CSI-RS and CSI-PTRS antenna ports. As discussed above, a CSI-PTRS antenna port may coincide with a CSI-RS antenna port, or may be assumed to be QCL with all or a subset of the CSI-RS antenna ports, e.g., with respect to phase, local oscillator characteristics/phase, and/or phase noise.

Figure 8:
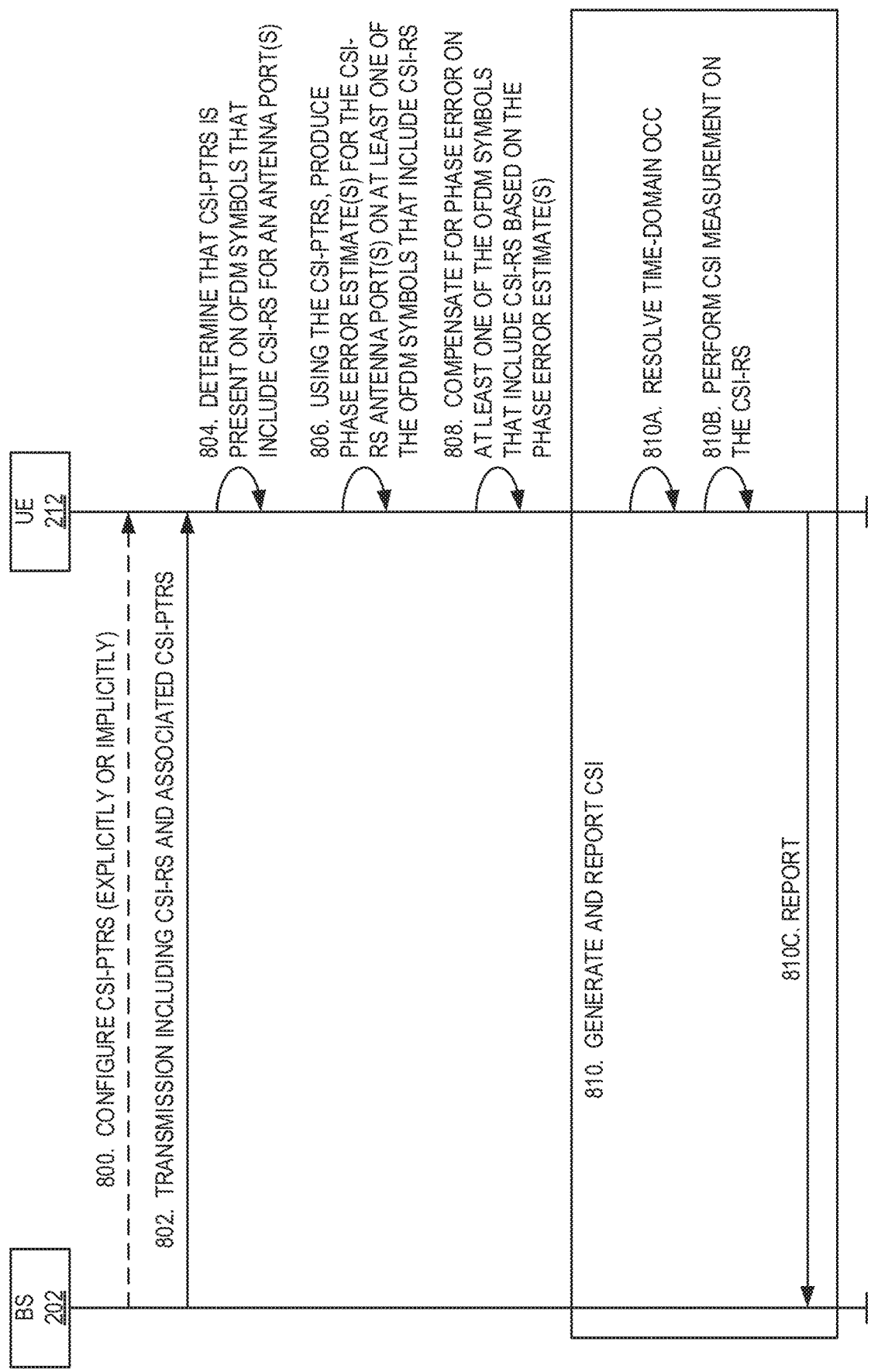
FIG. 8 illustrates the operation of a base station and a User Equipment (UE) in accordance with at least some embodiments of the present disclosure.

FIG. 8 illustrates the operation of a base station 202 and a UE 212 in accordance with at least some embodiments of the present disclosure. Optional steps are represented by dashed lines. Further, while the steps are illustrated as being in a particular order, the steps may be performed in any desired order unless otherwise explicitly stated or required. As illustrated, in some embodiments (optionally), the base station 202 signals a presence and/or configuration of CSI-PTRS to the UE 212, as described above (step 800). In other words, the base station 202 signals an indication(s) to the UE 212 that explicitly or implicitly indicates whether CSI-PTRS is present and, in some embodiments, one or more parameters for the CSI-PTRS, as described above.

The base station 202 transmits CSI-PTRS and an associated CSI-RS (step 802). In particular, CSI-PTRS is mapped to the same OFDM symbols as the CSI-RS. The mapping, or structure, of the CSI-PTRS within the OFDM symbols can be in accordance with any of the embodiments described herein. For example, the CSI-RS is transmitted within a configured frequency band, and the CSI-PTRS is either mapped to one or more PRBs at each edge of that frequency band or mapped to PRBs within that frequency band such that the CSI-PTRS is interleaved in frequency with the associated CSI-RS. In some embodiments, the CSI-PTRS uses the same sequence as the associated CSI-RS, but does not use a time-domain OCC (but may use a frequency-domain OCC). Further, in some embodiments, the CSI-PTRS is mapped to the same time-frequency resources (i.e., to the same set of resource elements) as the CSI-RS but in different PRBs than those to which the CSI-RS is mapped. In some other embodiments, the CSI-PTRS is mapped to different time-frequency resources (i.e., to a different set of resource elements within the same OFDM symbols as the associated CSI-RS) in some of the PRBs to which the associated CSI-RS is mapped. Other variations of the structure of the CSI-PTRS are described above.

The UE 212 determines that CSI-PTRS is present on two (or more) OFDM symbols that include CSI-RS for an antenna port(s) (step 804). This determination is made, for example, on signaling of one or more parameters that explicitly or implicitly indicate that CSI-PTRS is present and, in some embodiments, one or more configuration parameters (e.g., one or more parameters that define a sequence, time and/or frequency resources, bandwidth, etc.) for the CSI-PTRS. For example, a CSI-PTRS presence indicator may be explicitly signaled to the UE 212 where the UE 212 determines that CSI-PTRS is present based on this CSI-PTRS presence indicator. As another example, a CSI-PTRS presence indicator may be explicitly signaled to the UE 212, and the UE 212 determines whether CSI-PTRS is present based on the CSI-PTRS presence and one or more additional parameters that implicitly indicate whether CSI-PTRS is present and/or the one or more configuration parameters for the CSI-PTRS.

Using the CSI-PTRS associated with the CSI-RS, the UE 212 produces a phase error estimate(s) for the CSI-RS antenna port(s) on at least one of the OFDM symbols that include the CSI-RS (step 806). For example, if the CSI-RS includes CSI-RS for antenna ports 0-4 and CSI-PTRS for a CSI-PTRS antenna port that is QCL e.g., with respect to phase, local oscillator characteristics/phase, and/or phase noise with CSI-RS antenna ports 0-4 is present, the UE 212 uses the CSI-PTRS for that CSI-PTRS antenna port to produce an estimate of a phase offset between the two OFDM symbols onto which CSI-RS is mapped. This phase offset is referred to herein as a phase error between the two OFDM symbols (i.e., the error in phase for the CSI-RS mapped onto one of the two OFDM symbols relative to phase for the CSI-RS mapped onto the other OFDM symbol). Thus, if there are two OFDM symbols A and B, the CSI-PTRS is used by the UE 212 to produce an estimate of an offset between a phase of the CSI-PTRS received in OFDM symbol A and a phase of the CSI-PTRS received in OFDM symbol B. This offset is an estimate of a phase error between a phase of the CSI-RS for antenna ports 0-4 received in OFDM symbol A and a phase of the CSI-RS for antenna ports 0-4 received in OFDM symbol B. If multiple CSI-PTRS antenna ports are present, then this process is performed for each CSI-PTRS antenna port in order to produce a phase error estimate (i.e., a phase offset) between the OFDM symbols for the subset of the CSI-RS antenna ports that are QCL with that CSI-PTRS antenna port e.g., with respect to phase, local oscillator characteristics/phase, and/or phase noise. Note that in some embodiments the phase error estimate is an estimate of a common phase error, where a common phase error is a phase error that is common for all subcarriers in the configured CSI-RS frequency band.

The UE 212 uses the phase error estimate(s) produced in step 806 to compensate for phase error on the OFDM symbols that include the CSI-RS (step 808). More specifically, in some embodiments, the phase error estimate(s) include a phase error estimate for the phase of the CSI-RS in one of the OFDM symbols relative to that in another one of the OFDM symbols, and the phase of the CSI-RS in one or both of the OFDM symbols is/are rotated to compensate for the phase offset. In some other embodiments, the phase error estimates include a separate phase error estimate for each OFDM symbol that is an estimate of a phase offset between the phase of the CSI-RS in that OFDM symbol relative to a defined reference phase value. Then, for each OFDM symbol, the UE 212 compensates for phase error in that OFDM symbol by rotating a phase of the CSI-RS in that OFDM symbol to compensate for the phase error estimate for that OFDM symbol.

The UE 212 then generates and reports CSI using the phase-compensated CSI-RS (step 810). Note that, in some embodiments, the UE 212 uses the phase-compensated CSI-RS but not the CSI-PTRS when generating and reporting CSI. However, in some other embodiments, the UE 212 uses both the phase-compensated CSI-RS and the CSI-PTRS when generating and reporting CSI. More specifically, in some embodiments, the UE 212 resolves time-domain OCC for the CSI-RS (step 810A) and performs CSI measurement(s) on the phase-compensated CSI-RS (step 810B). Note that resolving the time-domain OCC essentially means multiplying the received signal with the conjugate of the reference signal sequence including the OCC code for the desired antenna port and then summing the signal on all the REs within the CDM group. Then, you will have constructive combining for the desired antenna port, but the signal on the other antenna ports will cancel. The type of CSI measurement(s) performed depends on the type of CSI report. For example, if RSRP is to be reported, then the UE 212 performs a RSRP measurement using the phase-compensated CSI-RS. The UE 212 then reports the CSI to the base station 202 (step 810C).

Note that while the example embodiments disclosed herein focus on the mapping of CSI-RS and thus CSI-PTRS onto two OFDM symbols, the present disclosure is not limited thereto. CSI-RS may be mapped to more than two OFDM symbols (e.g., 4 OFDM symbols using a length 4 OCC), in which case CSI-PTRS is also mapped to those same OFDM symbols. If CSI-RS and CSI-PTRS are mapped to more than two OFDM symbols, then the CSI-PTRS is utilized to determine a phase error estimate for each of the OFDM symbols. For example, the phase of one of the OFDM symbols may be used as a reference, and then the phase error estimate for each of the other OFDM symbols is a phase error relative to the reference. Phase compensation is then applied to the CSI-RS in the OFDM symbols in accordance with the respective phase error estimates. The resulting phase-compensated CSI-RS is then used to generate and report CSI, as described above. Therefore, it is to be understood that, when the present disclosure refers to the mapping of CSI-RS and CSI-PTRS onto "two OFDM symbols," the mapping of CSI-RS and CSI-PTRS to additional OFDM symbols is not to be precluded unless explicitly indicated (e.g., by the use of language such as mapping of CSI-RS and CSI-PTRS to "only two OFDM symbols").

Figure 9:
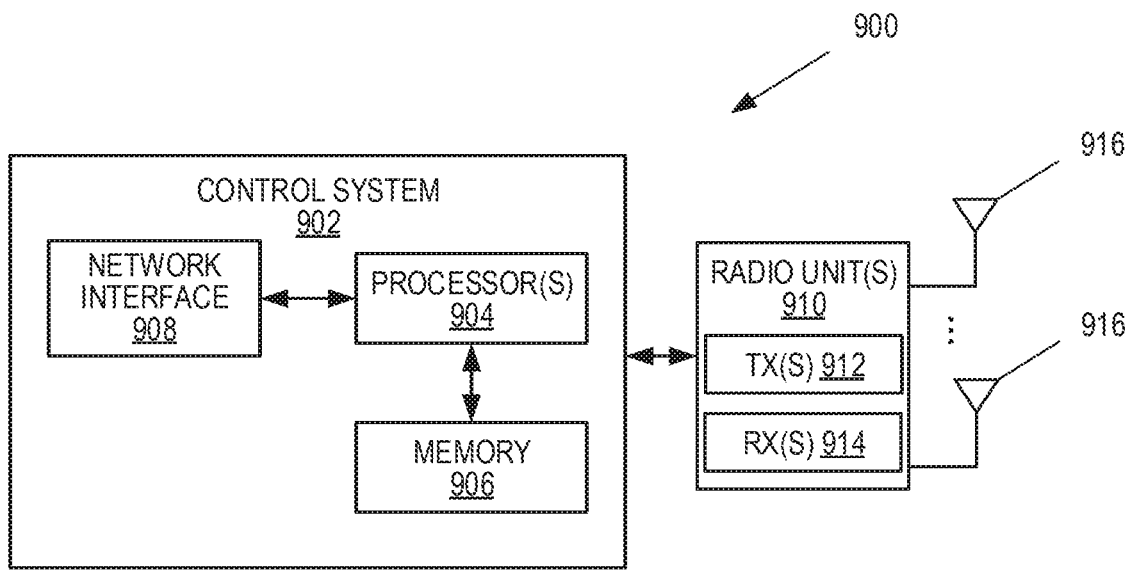
FIG. 9 is a schematic block diagram of a base station according to some embodiments of the present disclosure.

FIG. 9 is a schematic block diagram of a base station 900 according to some embodiments of the present disclosure. The base station 900 may be, for example, the base station 202 or 206. As illustrated, the base station 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. In addition, the base station 900 includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a base station 900 as described herein. In some embodiments, the function(s) are implemented in software that is stored, e.g., in the memory 906 and executed by the one or more processors 904.

Figure 10:
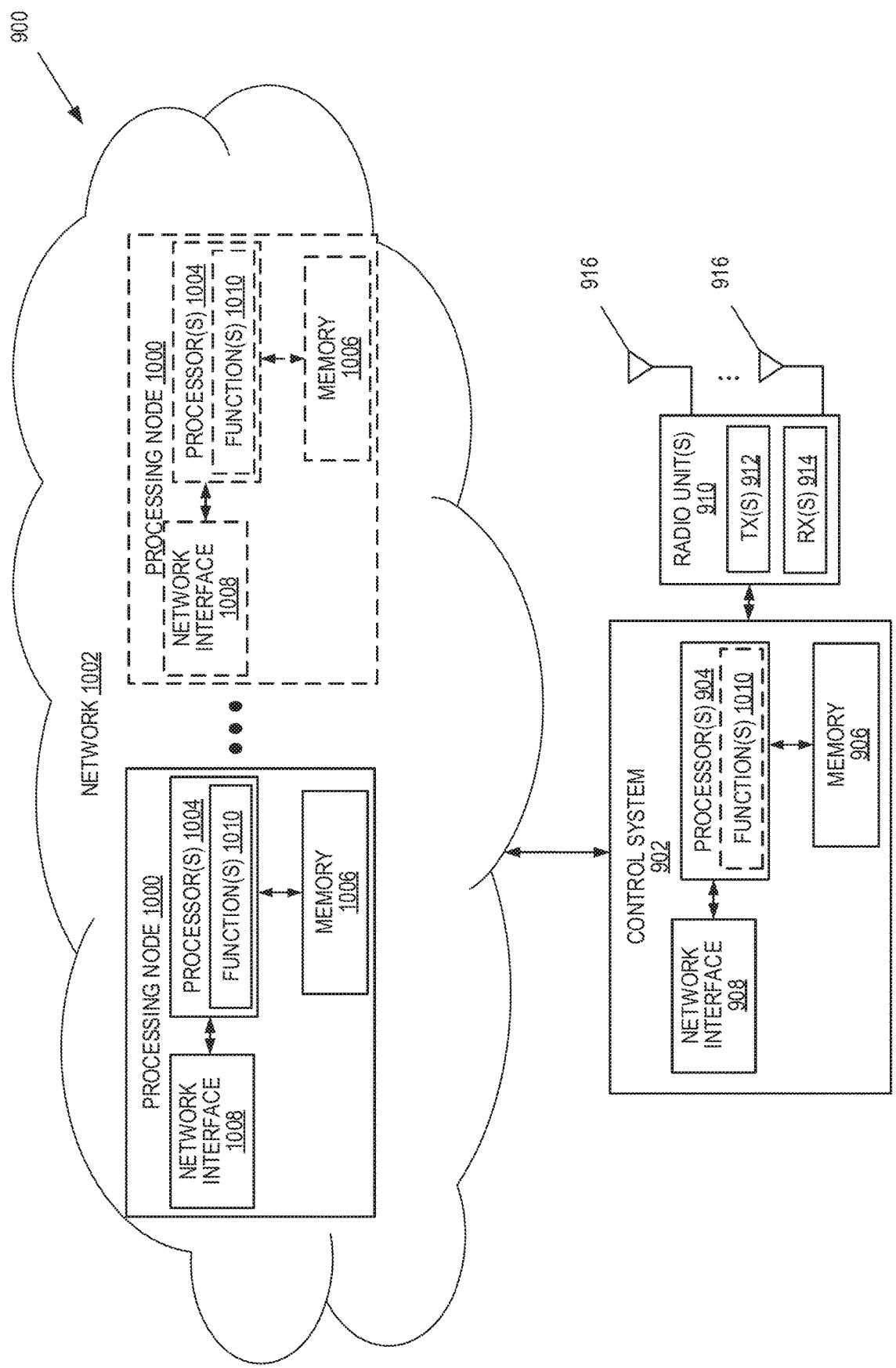
FIG. 10 is a schematic block diagram that illustrates a virtualized embodiment of the base station of FIG. 9 according to some embodiments of the present disclosure.

FIG. 10 is a schematic block diagram that illustrates a virtualized embodiment of the base station 900 according to some embodiments of the present disclosure. This discussion is equally applicable to other types of network nodes. Further, other types of network nodes may have similar virtualized architectures.

As used herein, a "virtualized" base station is an implementation of the base station 900 in which at least a portion of the functionality of the base station 900 is implemented as a virtual component(s) (e.g., via a virtual machine(s) executing on a physical processing node(s) in a network(s)). As illustrated, in this example, the base station 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the base station 900 described herein are implemented at the one or more processing nodes 1000 or distributed across the control system 902 and the one or more processing nodes 1000 in any desired manner. In some particular embodiments, some or all of the functions 1010 of the base station 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of base station 900 or a node (e.g., a processing node 1000) implementing one or more of the functions 1010 of the base station 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
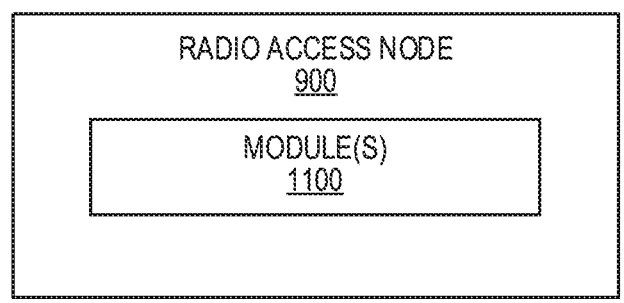
FIG. 11 is a schematic block diagram of the base station of FIG. 9 according to some other embodiments of the present disclosure.

FIG. 11 is a schematic block diagram of the base station 900 according to some other embodiments of the present disclosure. The base station 900 includes one or more modules 1100, each of which is implemented in software. The module(s) 1100 provide the functionality of the base station 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
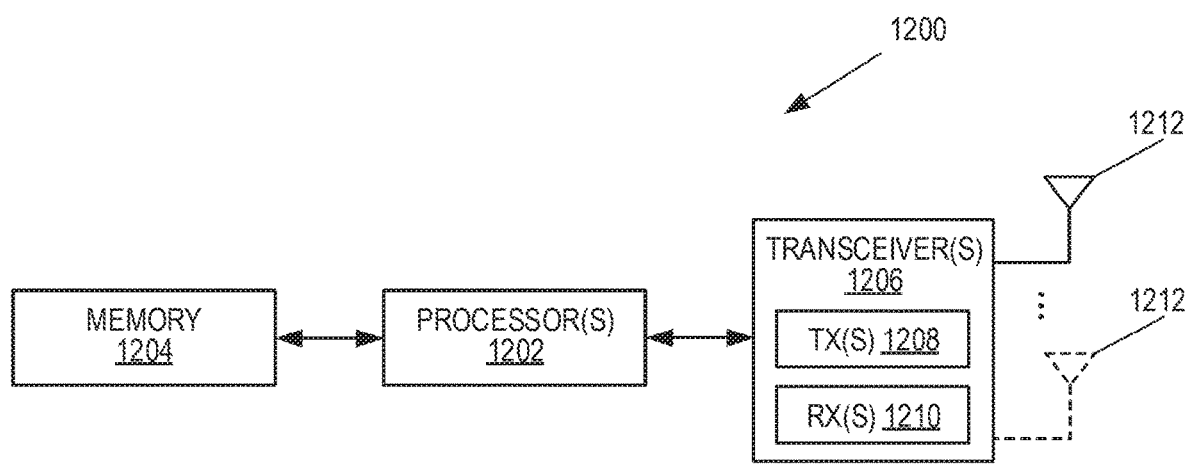
FIG. 12 is a schematic block diagram of a UE according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. In some embodiments, the functionality of the UE 1200 described above may be fully or partially implemented in software that is, e.g., stored in the memory 1204 and executed by the processor(s) 1202.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
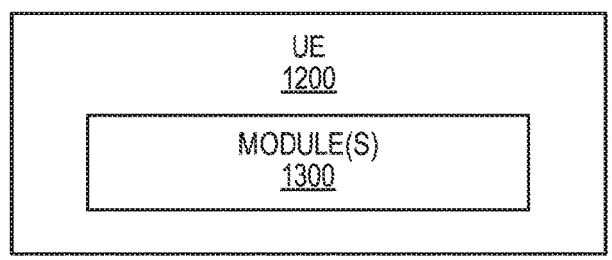
FIG. 13 is a schematic block diagram of the UE of FIG. 12 according to some other embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
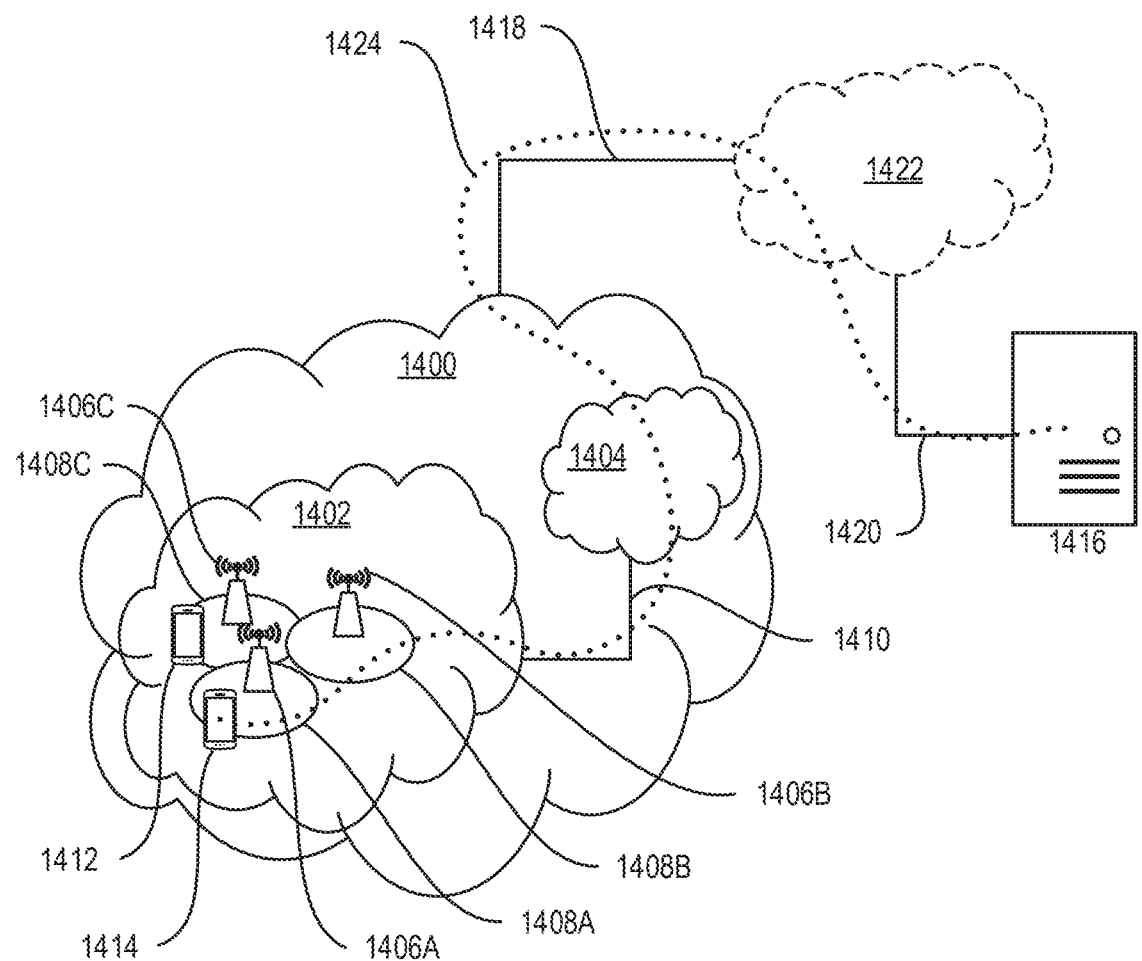
FIG. 14 illustrates a telecommunication network connected via an intermediate network to a host computer in accordance with some embodiments of the present disclosure.

With reference to FIG. 14, in accordance with an embodiment, a communication system includes a telecommunication network 1400, such as a 3GPP-type cellular network, which comprises an access network 1402, such as a Radio Access Network (RAN), and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
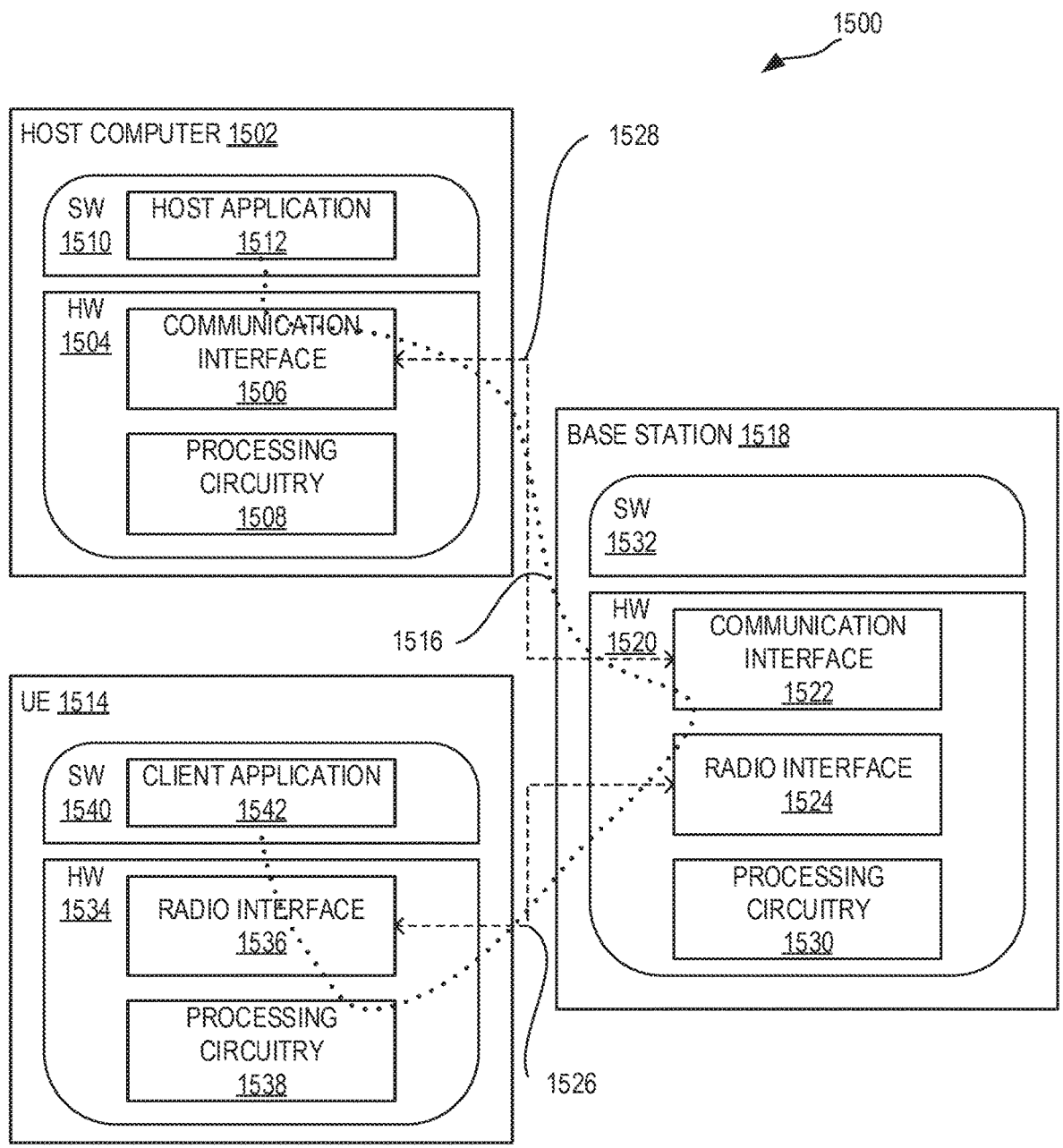
FIG. 15 is a generalized block diagram of a host computer communicating via a base station with a UE over a partially wireless connection in accordance with some embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve data rate, latency, and/or power consumption (e.g., via improved CSI reporting) and thereby provide benefits such as reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1514, and it may be unknown or imperceptible to the base station 1514. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

Figures 18, 19:
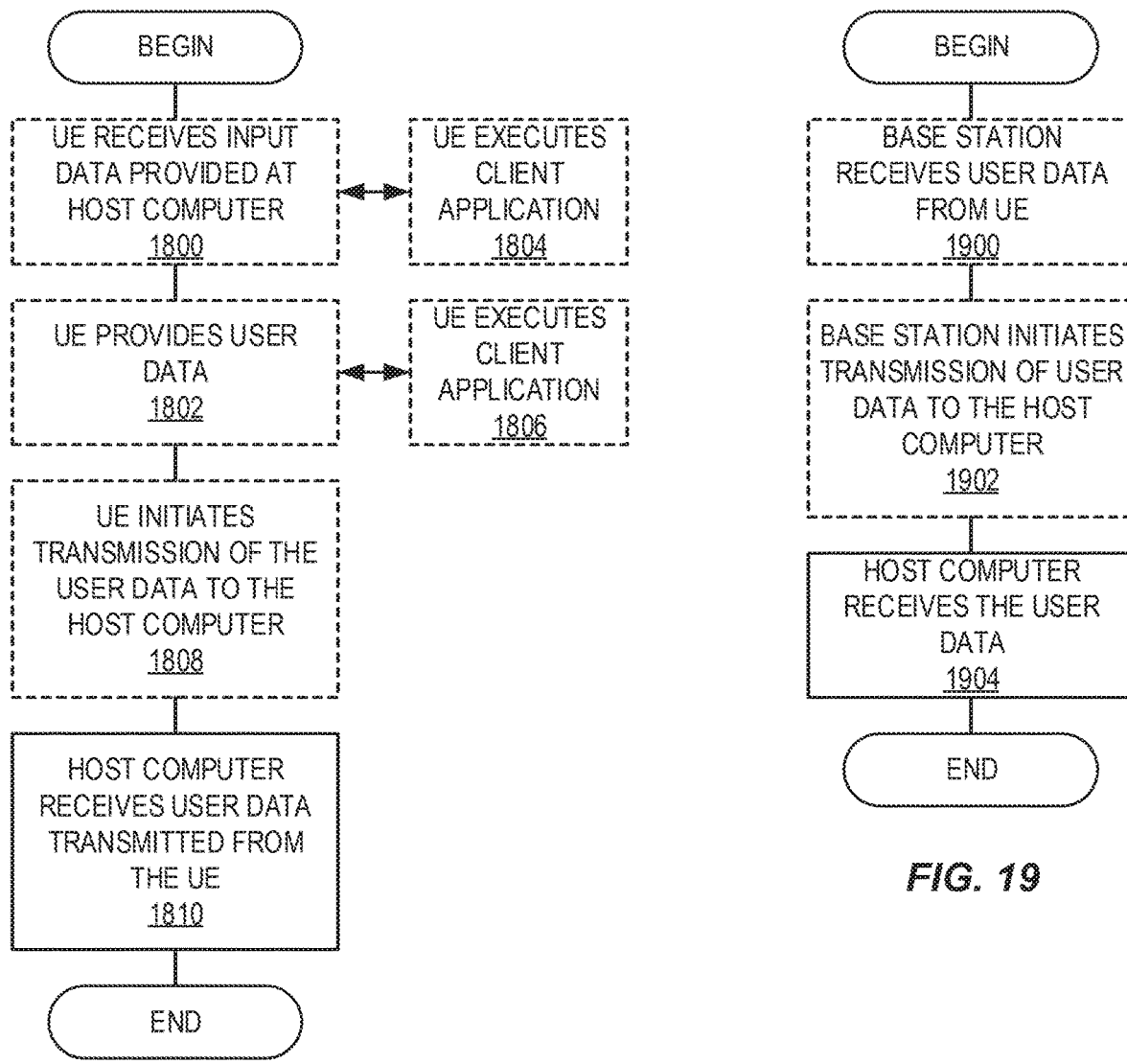
FIG. 18 is a flowchart illustrating a method implemented in a communication system in accordance with one embodiment on the present disclosure.
FIG. 19 is a flowchart illustrating a method implemented in a communication system in accordance with one embodiment of the present disclosure.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
    5G Fifth Generation
    AP Access Point
    ASIC Application Specific Integrated Circuit
    CDM Code Division Multiplexing
    CPU Central Processing Unit
    CQI Channel Quality Indication CSI Channel State Information
CSI-RS Channel State Information Reference Signal
DM-RS Demodulation Reference Signal
eNB Enhanced or Evolved Node B
FDM Frequency Division Multiplexing
FPGA Field Programmable Gate Array
GHz Gigahertz
gNB New Radio Base Station
LO Local Oscillator
LTE Long Term Evolution
MCS Modulation and Coding Scheme
MME Mobility Management Entity
MTC Machine Type Communication
NR New Radio
NZP Non-Zero Power
OCC Orthogonal Cover Code
OFDM Orthogonal Frequency Division Multiplexing
OTT Over-the-Top
P-GW Packet Data Network Gateway
PMI Precoding Matrix Indicator
PRB Physical Resource Block
PT-RS Phase Tracking Reference Signal
QCL Quasi Co-Located
RAN Radio Access Network
RAT Radio Access Technology
RRC Radio Resource Control
RRH Remote Radio Head
RSRP Reference Signal Received Power
SCEF Service Capability Exposure Function
TDM Time Domain Multiplexing
UE User Equipment Those skilled in the art will recognize improvements and modifications to the embodiments of the present disclosure. All such improvements and modifications are considered within the scope of the concepts disclosed herein.

What is claimed is:

1. A method of operation of a User Equipment, UE, in a wireless communication network, the method comprising:
   determining that a reference signal associated with a Channel State Information Reference Signal, CSI-RS, is present on two Orthogonal Frequency Division Multiplexing, OFDM, symbols onto which the CSI-RS is mapped, the reference signal being a reference signal that is present on OFDM symbols only when CSI-RS is present on the OFDM symbols;
   producing at least one phase error estimate for the CSI-RS that is mapped onto at least one of the two OFDM symbols based on the reference signal;
   compensating for phase error on at least one of the two OFDM symbols onto which the CSI-RS is mapped based on the at least one phase error estimate; and
   after compensating for phase error on the at least one of the two OFDM symbols onto which the CSI-RS is mapped, generating and reporting channel state information based on the CSI-RS;
   the CSI-RS being transmitted on a CSI-RS antenna port that is one of a plurality of CSI-RS antenna ports defined for the wireless communication network, and the reference signal being associated with the CSI-RS antenna port; and
   the reference signal being mapped to time-frequency resources within the two OFDM symbols onto which the reference signal is multiplexed with at least one other such reference signal transmitted on at least one other antenna port using frequency-domain Code Division Multiplexing, CDM, but not time-domain CDM.

2. The method of claim 1 wherein the reference signal is transmitted on an antenna port that coincides with the CSI-RS antenna port.

3. The method of claim 1 wherein the reference signal is transmitted on an antenna port that is defined as being quasi co-located with the CSI-RS antenna port.

4. The method of claim 1 wherein the reference signal is transmitted on an antenna port that is defined as being quasi co-located with a subset of the plurality of CSI-RS antenna ports, the subset of the plurality of CSI-RS antenna ports comprising the CSI-RS antenna port.

5. The method of claim 1 wherein the CSI-RS is mapped to time-frequency resources within the two OFDM symbols onto which the CSI-RS is multiplexed with other CSI-RSs on other CSI-RS antenna ports of the plurality of CSI-RS antenna ports using both frequency-domain CDM and time-domain CDM.

6. The method of claim 1 wherein the reference signal is mapped to time-frequency resources in one physical resource block that have subcarrier and symbol indices that are the same as those of time-frequency resources to which the CSI-RS is mapped in another physical resource block.

7. The method claim 1 wherein the reference signal is mapped to a set of time-frequency resources that is different than that to which the CSI-RS is mapped but within a same physical resource block.

8. The method of claim 1 wherein the at least one phase error estimate is at least one common phase error estimate that is common for all subcarriers.

9. The method of claim 1 wherein the at least one phase error estimate is a phase error estimate for the CSI-RS mapped to one of the two OFDM symbols relative to a phase for the CSI-RS mapped to the other one of the two OFDM symbols.

10. The method of claim 9 wherein compensating for phase error on the at least one of the two OFDM symbols onto which the CSI-RS is mapped comprises compensating for phase error on one of the two OFDM symbols onto which the CSI-RS in mapped based on the phase error estimate.

11. The method of claim 1 wherein the reference signal is mapped to time-frequency resources at edges of a bandwidth configured for the CSI-RS.

12. The method of claim 1 wherein the reference signal is interleaved, in frequency, with the CSI-RS.

13. The method of claim 1 wherein the reference signal is transmitted on a subset of a plurality of CSI-RS antenna ports defined for the wireless communication network with a same sequence as that used for the CSI-RS but mapped to time-frequency resources in such a way that multiple antenna ports are not code-multiplexed in time.

14. The method of claim 1 wherein determining that the reference signal associated with the CSI-RS is present on the two OFDM symbols onto which the CSI-RS is mapped comprises receiving signaling from a base station that indicates that the reference signal is present on the two OFDM symbols onto which the CSI-RS is mapped.

15. The method of claim 1 wherein determining that the reference signal associated with the CSI-RS is present on the two OFDM symbols onto which the CSI-RS is mapped comprises receiving signaling from a base station that indicates that the reference signal is present on the two OFDM symbols onto which the CSI-RS is mapped and one or more configuration parameters for the reference signal.

16. The method of claim 15 wherein the one or more configuration parameters comprise time-frequency resources to which the reference signal is mapped within the two OFDM symbols.

17. The method of claim 15 wherein the one or more configuration parameters comprise one or more parameters that define a sequence used for the reference signal.

18. The method of claim 15 wherein the one or more configuration parameters comprise a bandwidth of the reference signal within the two OFDM symbols.

19. The method of claim 1 wherein determining that the reference signal associated with the CSI-RS is present on the two OFDM symbols onto which the CSI-RS is mapped comprises determining that the reference signal associated with the CSI-RS is present on the two OFDM symbols onto which the CSI-RS is mapped based on at least one of:
   whether a Phase Tracking Reference Signal, PT-RS, for a Demodulation Reference Signal, DM-RS, and data is present in the two OFDM symbols;
   a configuration of the CSI-RS;
   a type of channel state information report to be generated and reported by the UE; and
   whether frequency division multiplexing of the CSI-RS and data in the two OFDM symbols is assumed.

20. The method of claim 1 wherein determining that the reference signal associated with the CSI-RS is present on the two OFDM symbols onto which the CSI-RS is mapped comprises determining that the reference signal associated with the CSI-RS is present on the two OFDM symbols onto which the CSI-RS is mapped and one or more configuration parameters for the reference signal based on at least one of:
   whether a Phase Tracking Reference Signal, PT-RS, for a Demodulation Reference Signal, DM-RS, and data is present in the two OFDM symbols;
   a configuration of the CSI-RS;
   a type of channel state information report to be generated and reported by the UE; and
   whether frequency division multiplexing of the CSI-RS and data in the two OFDM symbols is assumed.

21. The method of claim 1 wherein:
   the two OFDM symbols comprise a first OFDM symbol and a second OFDM symbol;
   producing the at least one phase error estimate for the CSI-RS comprises producing a phase estimate for the CSI-RS in the second OFDM symbol, where the phase estimate is an estimate of a phase error for the CSI-RS in the second OFDM symbol relative to a phase for the CSI-RS in the first OFDM symbol; and
   compensating for phase error on the two OFDM symbols comprises rotating a phase of the CSI-RS in at least one of the first and second OFDM symbols based on the phase error estimate to compensate for the phase error.

22. A User Equipment, UE, for a wireless communication network, the UE comprising:
   one or more transceivers;
   one or more processors; and
   memory storing instructions executable by the one or more processors that cause the UE to:
      determine that a reference signal associated with a Channel State Information Reference Signal, CSI-RS, is present on two Orthogonal Frequency Division Multiplexing, OFDM, symbols onto which the CSI-RS is mapped, the reference signal being a reference signal that is present on OFDM symbols only when CSI-RS is present on the OFDM symbols;
      produce at least one phase error estimate for the CSI-RS that is mapped onto at least one of the two OFDM symbols based on the reference signal;
      compensate for phase error on at least one of the two OFDM symbols onto which the CSI-RS is mapped based on the at least one phase error estimate;
      after compensating for phase error on the at least one of the two OFDM symbols onto which the CSI-RS is mapped, generate and report channel state information based on the CSI-RS;
      the CSI-RS being transmitted on a CSI-RS antenna port that is one of a plurality of CSI-RS antenna ports defined for the wireless communication network, and the reference signal being associated with the CSI-RS antenna port; and
      the reference signal being mapped to time-frequency resources within the two OFDM symbols onto which the reference signal is multiplexed with at least one other such reference signal transmitted on at least one other antenna port using frequency-domain Code Division Multiplexing, CDM, but not time-domain CDM.

23. A method of operation of a base station in a wireless communication network, the method comprising:
   transmitting a reference signal associated with a Channel State Information Reference Signal, CSI-RS, in two Orthogonal Frequency Division Multiplexing, OFDM, symbols in which the CSI-RS is mapped, the reference signal being a reference signal that is present on OFDM symbols only when CSI-RS is present on the OFDM symbols;
   receiving, from a User Equipment, UE, a report comprising a channel state information measurement that is based on the CSI-RS after phase compensation based on the reference signal;
   the CSI-RS being transmitted on a CSI-RS antenna port that is one of a plurality of CSI-RS antenna ports defined for the wireless communication network, and the reference signal being associated with the CSI-RS antenna port; and
   the reference signal being mapped to time-frequency resources within the two OFDM symbols onto which the reference signal is multiplexed with at least one other such reference signal transmitted on at least one other antenna port using frequency-domain Code Division Multiplexing, CDM, but not time-domain CDM.

24. A base station for a wireless communication network, the base station comprising:
   one or more radio units;
   one or more processors; and
   memory storing instructions executable by the one or more processors to cause the base station to:
      transmit a reference signal associated with a Channel State Information Reference Signal, CSI-RS, in two Orthogonal Frequency Division Multiplexing, OFDM, symbols in which the CSI-RS is mapped, the reference signal being a reference signal that is present on OFDM symbols only when CSI-RS is present on the OFDM symbols; and
      receive, from a User Equipment, UE, a report comprising a CSI measurement that is based on the CSI-RS after phase compensation based on the reference signal;
      the CSI-RS being transmitted on a CSI-RS antenna port that is one of a plurality of CSI-RS antenna ports defined for the wireless communication network, and the reference signal being associated with the CSI-RS antenna port; and the reference signal being mapped to time-frequency resources within the two OFDM symbols onto which the reference signal is multiplexed with at least one other such reference signal transmitted on at least one other antenna port using frequency-domain Code Division Multiplexing, CDM, but not time-domain CDM.

* * * * *